(12) United States Patent
Amanullah et al.

(10) Patent No.: US 9,957,433 B2
(45) Date of Patent: May 1, 2018

(54) PREPARATION AND USE OF DRILLING FLUIDS WITH DATE SEED POWDER FLUID LOSS ADDITIVE

(71) Applicant: Saudi Arabian Oil Company, Dhahran (SA)

(72) Inventors: Md Amanullah, Dhahran (SA); Jothibasu Ramasamy, Dammam (SA); Turki Thuwaini Mohammed Alsubaie, Dhahran (SA); Omar A. Fuwaires, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days. days.

(21) Appl. No.: 15/135,057

(22) Filed: Apr. 21, 2016

(65) Prior Publication Data

US 2016/0312100 A1 Oct. 27, 2016

Related U.S. Application Data (60) Provisional application No. 62/151,908, filed on Apr. 23, 2015.

(51) Int. Cl.
| | | |
|---|---|---|
| C09K 8/06 | (2006.01) |
| C09K 8/08 | (2006.01) |
| C09K 8/487 | (2006.01) |
| E21B 21/00 | (2006.01) |
| C09K 8/50 | (2006.01) |

(52) U.S. Cl.
CPC .............. *C09K 8/08* (2013.01); *E21B 21/003* (2013.01); *C09K 8/50* (2013.01); *C09K 2208/04* (2013.01)

(58) Field of Classification Search
CPC ......... E21B 21/003; C09K 8/487; C09K 8/06; C09K 8/08
See application file for complete search history.

(56) References Cited

U.S. PATENT DOCUMENTS

| | | | |
|---|---|---|---|
| 2,943,679 | A | 7/1960 | Fischer et al. |
| 3,042,607 | A | 7/1962 | Morris |
| 3,132,693 | A | 5/1964 | Weisend |
| 3,629,102 | A | 12/1971 | Lummus et al. |
| 4,474,665 | A | 10/1984 | Green |

(Continued)

FOREIGN PATENT DOCUMENTS

| | | |
|---|---|---|
| GB | 2106956 | 4/1983 |
| GB | 2506603 | 4/2014 |

(Continued)

OTHER PUBLICATIONS

Wajheeuddin et al: "An Experimental Study on Particle Sizing of Natural Substitutes for Drilling Fluid Applications," Journal of Nature Science and Sustainable Technology, Apr. 1, 2014, pp. 259-324.

(Continued)

*Primary Examiner* — Catherine Loikith
(74) *Attorney, Agent, or Firm* — Fish & Richardson P.C.

(57) ABSTRACT

Date seed powder can be used as a fluid loss additive for drilling fluids by mixing a quantity of date seed powder with a volume of fluid resulting in a mixture. The date seed powder or the mixture can be added to a drilling fluid. The drilling fluid that includes the date seed powder or the mixture can be used to drill a wellbore.

24 Claims, 5 Drawing Sheets

(56) References Cited

U.S. PATENT DOCUMENTS

| | | | |
|---|---|---|---|
| 5,009,269 A | 4/1991 | Moran et al. | |
| 5,118,664 A | 6/1992 | Burts, Jr. | |
| 5,294,651 A | 3/1994 | Stephens | |
| 5,332,724 A | 7/1994 | Burts, Jr. | |
| 5,789,349 A | 8/1998 | Patel | |
| 7,226,895 B2 | 6/2007 | Xiang | |
| 7,422,061 B2 | 9/2008 | Jones et al. | |
| 2010/0230169 A1 | 9/2010 | Pomerleau | |
| 2013/0065798 A1 | 3/2013 | Amanullah | |
| 2015/0051120 A1* | 2/2015 | Hurd | C09K 8/36 507/131 |
| 2017/0058180 A1* | 3/2017 | Hossain | C09K 8/206 |

FOREIGN PATENT DOCUMENTS

| | | |
|---|---|---|
| WO | WO2002046253 A3 | 6/2002 |
| WO | WO2013120636 A1 | 8/2013 |

OTHER PUBLICATIONS

Amanullah et al: "Application of an indigenous eco-friendly raw material as fluid loss additive," Journal of Petroleum Science and Engineering, vol. 139, Dec. 28, 2015, pp. 191-197.

International Search Report and Written Opinion issued in International Application No. PCT/US2016/028556, dated Jul. 12, 2016.

* cited by examiner

PREPARATION AND USE OF DRILLING FLUIDS WITH DATE SEED POWDER FLUID LOSS ADDITIVE

CROSS-REFERENCE TO RELATED APPLICATIONS

This application claims the benefit of priority to U.S. Provisional Application Ser. No. 62/151,908, filed on Apr. 23, 2015, the contents of which are hereby incorporated by reference.

TECHNICAL FIELD

This disclosure relates to drilling fluids, e.g., water-based drilling fluids.

BACKGROUND

A wellbore is a drilled hole or borehole formed through a subterranean zone (e.g., a formation, multiple formations, or a portion of a formation) to recover hydrocarbons in the zone. To form the wellbore, a wellbore drilling system, which can include a drill bit, is lowered into the zone using drill strings. The drill strings are positioned in the wellbore to form an annulus between an outer wall of the drill strings and an inner wall of the wellbore. Drilling fluids (sometimes called drilling muds) are flowed from the surface through the drill strings to the drilling system. The drilling fluids exit the drilling system, e.g., through ports in the drill bits, and flow through the annulus formed between the drill strings and the wellbore to the surface. The drilling fluids serve several functions including, e.g., cooling the drill bits, carrying cuttings to the surface, and other functions. The drilling fluids can be water or oil-based. Because the subterranean zone can include porous rock, the drilling fluids can sometimes be lost into the surround formation when flowing through the annulus.

SUMMARY

This disclosure describes a fluid loss additive to control drilling fluid loss.

Certain aspects of the subject matter described here can be implemented as a method. The method includes mixing a date seed powder and a homogenizer with a fluid to provide a drilling fluid. The method further includes using the drilling fluid to drill a wellbore.

The fluid can include water. The drilling fluid can be a clay-free drilling fluid. The homogenizer can be at least one of psyllium husk (PHP), modified starch (MS) or xanthan gum (XC). The homogenizer can be present at a concentration of about 0.1% to about 5% weight/volume percent (w/v). The homogenizer can include xanthan gum and be present at a concentration of about 0.3% w/v. The homogenizer can include modified starch and be present at a concentration of about 0.3% w/v. The homogenizer can include psyllium husk and be present at a concentration of about 0.6% w/v. An alkaline salt can be added to the drilling fluid to increase the pH of the drilling fluid. The alkaline salt added can include sodium hydroxide. The quantity of alkaline salt added can be sufficient to increase the pH of the drilling fluid to greater than about 9. The quantity of alkaline salt added can be sufficient to increase the pH of the drilling fluid to between about 9 and about 10.5. The method can further include adding a defoamer to the drilling fluid. The quantity of defoamer can be sufficient to remove air bubbles from the drilling fluid with which the date seed powder is mixed. The date seed powder can be in a particulate form. For example, the date seed powder can have a size distribution of less than about 150 The date seed powder can have a size distribution ranging between about 50 μm and about 150 The date seed powder can be present at a concentration of about 1% w/v to about 5% w/v. For example, the date seed powder can be present at a concentration of about 2% w/v. To use the drilling fluid to drill a wellbore, the drilling fluid that includes the mixture can be flowed into the wellbore.

Certain aspects of the subject matter described here can be implemented as a method. A wellbore can be drilled using a drilling fluid that includes a date seed powder, a homogenizer, and a fluid. The drilling fluid can be a clay-free drilling fluid. The fluid can include water. In some embodiments, the homogenizer includes at least one of psyllium husk, modified starch, or xanthan gum. The homogenizer can be present at a concentration of about 0.1% to about 5% w/v. For example, the homogenizer includes xanthan gum and is present at a concentration of about 0.3% w/v. In some embodiments, the homogenizer includes modified starch and is present at a concentration of about 0.3% w/v. In some embodiments, the homogenizer includes psyllium husk and is present at a concentration of about 0.6% w/v.

In some embodiments, the method further includes adding an alkaline salt to the drilling fluid to increase the pH of the fluid. The alkaline salt can include sodium hydroxide. The quantity of alkaline salt can be sufficient to increase the pH of the drilling fluid to greater than about 9. For example, the quantity of alkaline salt can be sufficient to increase the pH of the drilling fluid to between about 9 and about 10.5.

In some embodiments, the method further includes adding a defoamer to the drilling fluid. The quantity of defoamer can be sufficient to remove air bubbles from the fluid.

In some embodiments, the date seed powder is in particulate form. For example, the date seed powder can have a size distribution of less than about 150 μm. The date seed powder can also have a size distribution ranging between 50 μm and 150 μm. In some embodiments, the date seed powder can be present at a concentration of about 1% w/v to about 5% w/v. For example, the date seed powder can be present at a concentration of about 2% w/v.

The present disclosure also relates to a drilling fluid. The drilling fluid includes a date seed powder, a homogenizer, and a fluid. The drilling fluid can be a clay-free drilling fluid. The fluid can include water. In some embodiments, the homogenizer includes at least one of psyllium husk, modified starch, or xanthan gum. The homogenizer can be present at a concentration of about 0.1% to about 5% w/v. For example, the homogenizer can include xanthan gum and be present at a concentration of about 0.3% w/v. The homogenizer can include modified starch and be present at a concentration of about 0.3% w/v. In some embodiments, the homogenizer includes psyllium husk and is present at a concentration of about 0.6% w/v.

In some embodiments, the drilling fluid includes adding an alkaline salt to the drilling fluid to increase the pH of the fluid. The alkaline salt can include sodium hydroxide. The quantity of alkaline salt can be sufficient to increase the pH of the drilling fluid to greater than about 9. For example, the quantity of alkaline salt can be sufficient to increase the pH of the drilling fluid to between about 9 and about 10.5.

In some embodiments, the drilling fluid further includes a defoamer. The quantity of defoamer can be sufficient to remove air bubbles from the fluid.

In some embodiments, the date seed powder is in particulate form. For example, the date seed powder can have a size distribution of less than about 150 µm. The date seed powder can also have a size distribution ranging between 50 µm and 150 µm. In some embodiments, the date seed powder can be present at a concentration of about 1% w/v to about 5% w/v. For example, the date seed powder can be present at a concentration of about 2% w/v.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This disclosure describes date seed powder as a fluid loss additive for drilling fluids. In the course of drilling a well, water-based or oil-based drilling fluids are pumped from the surface to the bottom of the hole and then brought back to the surface by using appropriate rig hydraulics and mud pumps. As the subsurface zone is porous and permeable, drilling fluids can be lost into the zone. Excessive loss of alkaline mud filtrate of a drilling mud to the near wellbore formation can cause swelling and dispersion of clays in the formations leading to borehole instability problems. The excessive loss of mud filtrate can also cause severe formation damage while drilling the subterranean zone. Moreover, the loss of drilling fluids beyond an acceptable range as a result of the escape of water to the porous formations can change the rheological and thixotropic properties of the drilling fluids. Excessive dewatering of drilling fluid in differential sticking prone, high permeable zones can create a thick mud cake on the borehole wall. The alteration of the functional capability of drilling muds due to excessive dewatering can lead to different types of costly drilling problems such as poor hole cleaning, hole fill up, pipe sticking, induced loss of circulation, high surge and swabbing effect while making a trip, or other drilling problems. At least for these reasons, control of the fluid loss potential of drilling fluids while making a borehole is important both for drilling and production phases of oil and gas exploration and exploitation.

Fluid loss additives are used in the formulation of drilling and completion fluids to control the loss of fluid to the surrounding formations within an acceptable range, e.g., less than about 15 cc/30 minutes in standard the American Petroleum Institute (API) test condition (e.g., API Recommended Practice 13B-1 and 13B-2). Various organic and inorganic polymers and also plant-based materials can be used as fluid loss control additives to maintain the quality and functional ability of the drilling fluids. Some synthetic polymeric additives are not easily biodegradable and thus can cause some environmental problems, especially in sensitive environments.

This disclosure describes the application of date seed powder as a fluid loss additive or fluid loss additive supplement for water-based drilling fluids to prevent excessive loss of the drilling fluid during wellbore formation. The date seed power can be an ecofriendly and easily biodegradable natural fluid loss additive suitable for application in sensitive environments, e.g., offshore drilling environments. As described below, the date seed powder can be formed from dates into particles having a size distribution ranging between 50 µm and 150 µm. Also as described below, API fluid loss tests and High Temperature/High Pressure (HTHP) tests at 212° F. and 500 psi overbalance pressure indicate that the presence of date seed powder can significantly reduce API and HTHP fluid loss behavior of clay free systems. Implementing date seed powder as a fluid loss additive enables reusing waste by-product of the date palm industry. Date seed powder can serve as a viable alternative to other fluid loss additives that may be difficult to manufacture or expensive to procure (or both).

Figure 1A:
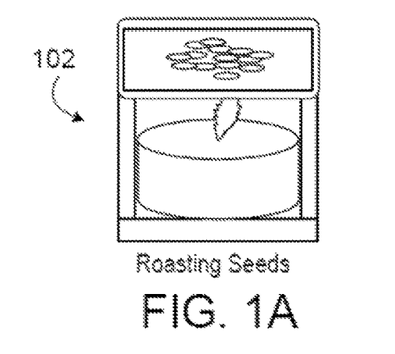
FIGS. 1A-1C are schematic diagrams of date seed powder preparation systems.
Figure 1B:
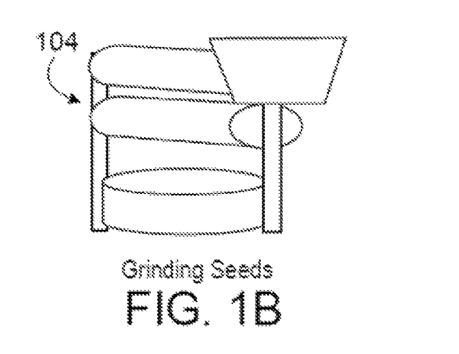
Figure 1C:
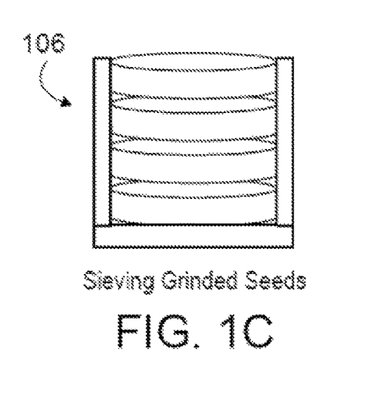
Figure 2:
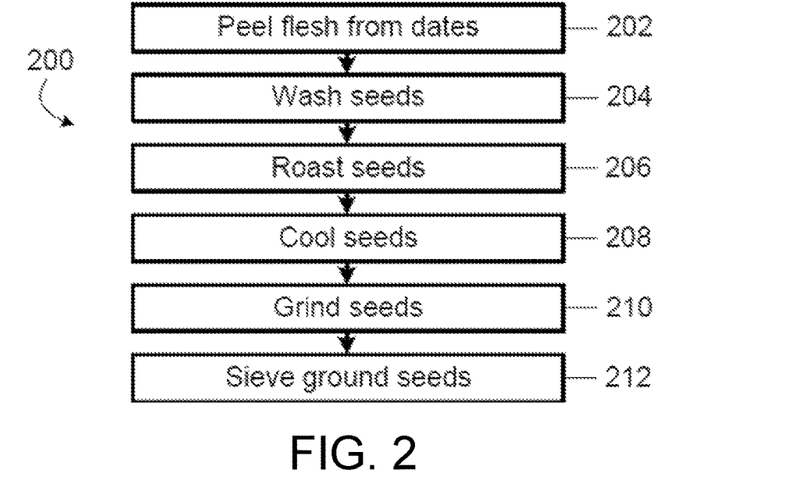
FIG. 2 is a flowchart of an example process for preparing date seed powder.

FIGS. 1A-1C are schematic diagrams of date seed powder preparation systems. FIG. 2 is a flowchart of an example process 200 for preparing date seed powder. At 202, flesh from dates is peeled to isolate the seeds. At 204, the isolated seeds are washed, e.g., with fresh water or other fluid, to remove sticky flesh from the seed. At 206, the seeds are roasted. For example, FIG. 1A shows a roaster 102, such as a pan or utensil with a flat surface, to roast the seeds. Roasting the seeds can remove any excessive moisture in the seeds, which, in turn, can make the seeds more brittle and consequently easily grindable. At 208, the roasted seeds are cooled, e.g., to room temperature. At 210, the roasted, cooled seeds are ground. For example, FIG. 113 shows a grinder 104 to grind a quantity (e.g., 100 g or other quantity) of the seeds into powder that includes particles of different sizes in the micrometer range. The grinder 104 can be a programmable grinding machine that can grind the seeds for a duration (e.g., about 30 to 40 minutes) in multiple steps. At 212, the ground seeds can be sieved. For example, FIG. 1C shows a sieve system 106 that can include one or more sieves having meshes of different sizes. Passing the ground seeds through the sieves in the sieve system 106 can allow separating the ground seeds into particles of sizes that correspond to the sizes of the meshes. In this manner, in some implementations, date seed powder having sizes of less than 150 µm can be obtained.

Drilling Fluids Including Date Seeds

The present disclosure relates to a drilling fluid. The drilling fluid includes a date seed powder, a homogenizer, and a fluid.

The drilling fluid can be a clay-free drilling fluid. The fluid can include water. For example, the drilling fluid can be a clay-free, water-based drilling fluid. The water can include fresh water, brine, produced water, flowback water, brackish water, seawater, and mixtures thereof.

As used herein, the term "clay-free" refers to a drilling fluid formulated without addition of any clays to the drilling fluid. During drilling, such "clay-free" drilling fluids may acquire clays and lignites from the formation or from mixing with recycled fluids containing clays and lignites.

In some embodiments, the date seed powder is in particulate form. For example, the date seed powder can have a size distribution of less than about 150 μm. The date seed powder can also have a size distribution ranging between 50 μm and 150 μm.

As used herein, the term "about" can allow for a degree of variability in a value or range, for example, within 10%, within 5%, or within 1% of a stated value or of a stated limit of a range.

In some embodiments, the date seed powder is present at a concentration of about 1% w/v to about 10% w/v, about 1% w/v to about 5% w/v, or about 1% w/v to about 3% w/v. For example, the date seed powder can be present at a concentration of about 10% w/v, 7%, 5%, 3%, 2%, or about 1% w/v.

As used herein "w/v" refers to the grams of a component per 100 mL of fluid. For example, 6 g of date seed powder in 350 mL of fluid would be present in the fluid at a concentration of about 1.7% w/v.

In some embodiments, the homogenizer includes at least one of psyllium husk, modified starch, or xanthan gum. The homogenizer can also include a polysaccharide; a biopolymers or derivatives thereof that contain one or more of these monosaccharide units: galactose; mannose; glucoside; glucose; xylose; arabinose; fructose; glucuronic acid; or pyranosyl sulfate. Examples of suitable polysaccharides include, but are not limited to, guar gums (e.g., hydroxyethyl guar, hydroxypropyl guar, carboxymethyl guar, carboxymethylhydroxyethyl guar, and carboxymethylhydroxypropyl guar ("CMHPG")); cellulose derivatives (e.g., hydroxyethyl cellulose, carboxyethylcellulose, carboxymethylcellulose, and carboxymethyl hydroxyethyl cellulose); scleroglucan; succinoglycan; diutan; or combinations thereof.

The homogenizer can be present at a concentration of about 0.1% to about 10% w/v, about 0.1% to about 8% w/v, about 0.1% to about 6% w/v, about 0.1% to about 5% w/v, about 0.1% to about 4% w/v, about 0.1% to about 3% w/v, about 0.1% to about 2% w/v, or about 0.1% to about 1% w/v. For example, the homogenizer can be present at a concentration of about 10% w/v, 8%, 6%, 5%, 4%, 3%, 2%, 1%, 0.9%, 0.6%, or about 0.3% w/v. The homogenizer can include xanthan gum and be present at a concentration of about 0.1% to about 2% w/v. The homogenizer can include xanthan gum and be present at a concentration of about 0.3% w/v. For example, the drilling fluid can include about 1 g of xanthan gum per 350 mL of fluid. The homogenizer can include modified starch and be present at a concentration of about 0.1% to about 2% w/v. The homogenizer can include modified starch and be present at a concentration of about 0.3% w/v. For example, the drilling fluid can include about 1 g of modified starch per 350 mL of water. The homogenizer can include psyllium husk and be present at a concentration of about 1% to about 3% w/v. The homogenizer can include psyllium husk and be present at a concentration of about 0.6% w/v. For example, the drilling fluid can include about 1 g of psyllium husk per 175 mL of fluid.

In some embodiments, the drilling fluid includes an alkaline salt, which can increase the pH of the drilling fluid. The alkaline salt can include sodium hydroxide, potassium hydroxide, magnesium hydroxide, calcium hydroxide, sodium silicate, sodium carbonate, magnesium oxide, and combinations thereof. In some embodiments, the alkaline salt includes sodium hydroxide (NaOH). The quantity of alkaline salt can be sufficient to increase the pH of the drilling fluid to a pH of greater than about 9. For example, the quantity of alkaline salt can be sufficient to increase the pH of the drilling fluid to a pH of between about 9 and about 10.5.

In some embodiments, the drilling fluid further includes a defoamer. The quantity of defoamer can be sufficient to remove air bubbles from the fluid. For example, about two to three drops of defoamer can be added per 350 mL of the fluid.

The drilling fluid can additionally include one or more additives including a surfactant (e.g., a foamer, a wetting agent, a detergent, a lubricant, or a corrosion inhibitor), a water softener, an oxygen scavenger, a biocide, a corrosion inhibitor, and a weighting agent.

Preparation of Drilling Fluids Including Date Seeds

Also, provided in this disclosure is a method for preparing a drilling fluid. The method includes mixing a date seed powder and a homogenizer with a fluid to provide a drilling fluid.

The drilling fluid can be a water-based drilling fluid. The drilling fluid can be a clay-free drilling fluid. For example, the drilling fluid can be a clay-free, water-based drilling fluid. The water can include fresh water, brine, produced water, flowback water, brackish water, seawater, and mixtures thereof.

In some embodiments, the date seed powder is in particulate form. For example, the date seed powder can have a size distribution of less than about 150 μm. The date seed powder can also have a size distribution ranging between 50 μm and 150 μm.

In some embodiments, the date seed powder is present at a concentration of about 1% w/v to about 10% w/v, about 1% w/v to about 5% w/v, or about 1% w/v to about 3% w/v. For example, the date seed powder can be present at a concentration of about 10% w/v, 7%, 5%, 3%, 2%, or about 1% w/v The homogenizer can be at least one of psyllium husk (PHP), modified starch (MS) or xanthan gum (XC). In some embodiments, the homogenizer includes at least one of psyllium husk, modified starch, or xanthan gum. The homogenizer can also include at least a polysaccharide; a biopolymers or derivatives thereof that contain one or more of these monosaccharide units: galactose; mannose; glucoside; glucose; xylose; arabinose; fructose; glucuronic acid; or pyranosyl sulfate. Examples of suitable polysaccharides include, but are not limited to, guar gums (e.g., hydroxyethyl guar, hydroxypropyl guar, carboxymethyl guar, carboxymethylhydroxyethyl guar, and carboxymethylhydroxypropyl guar ("CMHPG")); cellulose derivatives (e.g., hydroxyethyl cellulose, carboxyethylcellulose, carboxymethylcellulose, and carboxymethyl hydroxyethyl cellulose); scleroglucan; succinoglycan; diutan; and combinations thereof.

The homogenizer can be present at a concentration of about 0.1% to about 10% w/v, about 0.1% to about 8% w/v, about 0.1% to about 6% w/v, about 0.1% to about 5% w/v, about 0.1% to about 4% w/v, about 0.1% to about 3% w/v, about 0.1% to about 2% w/v, or about 0.1% to about 1% w/v. For example, the homogenizer can be present at a concentration of about 10% w/v, 8%, 6%, 5%, 4%, 3%, 2%, 1%, 0.9%, 0.6%, or about 0.3% w/v. The homogenizer can include xanthan gum and be present at a concentration of about 0.1% to about 2% w/v. The homogenizer can include xanthan gum and be present at a concentration of about 0.3% w/v. For example, the drilling fluid can include about 1 g of xanthan gum per 350 mL of fluid. The homogenizer can include modified starch and be present at a concentration of about 0.1% to about 2% w/v. The homogenizer can include modified starch and be present at a concentration of about 0.3% w/v. For example, the drilling fluid can include about 1 g of modified starch per 350 mL of water. The homogenizer can include psyllium husk and be present at a concentration of about 1% to about 3% w/v. The homogenizer can include psyllium husk and be present at a concentration of about 0.6% w/v. For example, the drilling fluid can include about 1 g of psyllium husk per 175 mL of fluid.

The method can further include adding an alkaline salt to increase the pH of the drilling fluid. The alkaline salt can include sodium hydroxide, potassium hydroxide, magnesium hydroxide, calcium hydroxide, sodium silicate, sodium carbonate, magnesium oxide, and combinations thereof. In some embodiments, the alkaline salt added includes sodium hydroxide. The quantity of alkaline salt added can be sufficient to increase the pH of the drilling fluid to a pH of greater than about 9. The quantity of alkaline salt added can be sufficient to increase the pH of the drilling fluid to a pH of between about 9 and about 10.5.

The method can further include adding a defoamer to the drilling fluid. The quantity of defoamer can be sufficient to remove air bubbles from the drilling fluid with which the date seed powder is mixed.

To use the drilling fluid to drill a wellbore, the drilling fluid can be flowed into the wellbore.

Figure 3:
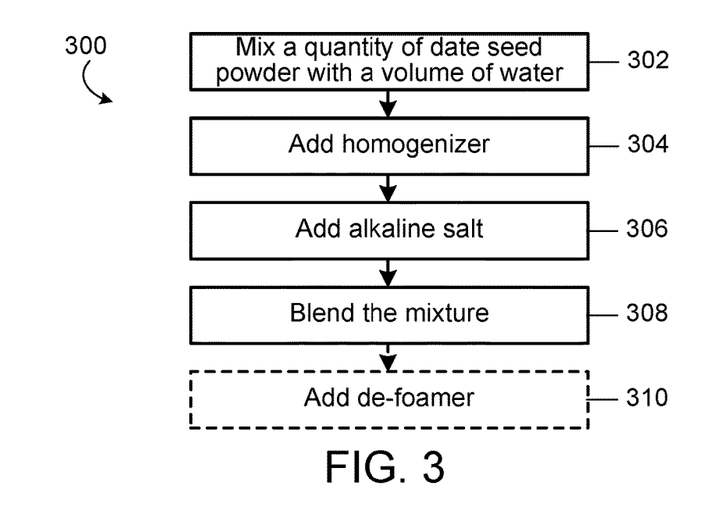
FIG. 3 is a flowchart of an example process for preparing drilling fluid that includes date seed powder.

FIG. 3 is a flowchart of an example process 300 for preparing drilling fluid that includes date seed powder. At 302, a quantity of date seed powder is mixed with a volume of water. At 304, a homogenizer is added to the mixture to homogeneously suspend the date seed powder in the drilling fluid. The homogenizer can be, for example, psyllium husk (PHP), modified starch (MS) or xanthan gum (XC). A quantity of the homogenizer added to the mixture can be sufficient to increase the viscosity of the water such that the quantity of date seed powder can be homogenously distributed across the volume of water. At 306, an alkaline salt (e.g., sodium hydroxide or other alkaline salt) is added to adjust the pH of the drilling fluid such that the drilling fluid is alkaline. Examples of alkaline salts include sodium hydroxide, potassium hydroxide, magnesium hydroxide, calcium hydroxide, sodium silicate, sodium carbonate, or other alkaline salts. At 308, the mixture can be blended, e.g., by using a high speed mixer. In case of excessive foaming, at 310, defoamer can be added to remove air bubbles. Several water-based drilling fluids including date seed powder were formulated by implementing the process 300 as shown in tables below.

Method of Drilling a Wellbore

Also provided in this disclosure is a method of drilling a wellbore. The wellbore is drilled using a drilling fluid that includes a date seed powder, a homogenizer, and a fluid.

The drilling fluid can be a clay-free drilling fluid. The fluid can include water. For example, the drilling fluid can be a clay-free, water-based drilling fluid. The water can include fresh water, brine, produced water, flowback water, brackish water, seawater, and mixtures thereof. In some embodiments, water, including any dissolved materials therein, is present in the drilling fluids in an amount in the range from about 50% to 100% by volume of the drilling fluid.

In some embodiments, the date seed powder is in particulate form. For example, the date seed powder can have a size distribution of less than about 150 µm. The date seed powder can also have a size distribution ranging between 50 µm and 150 µm.

In some embodiments, the date seed powder is present at a concentration of about 1% w/v to about 10% w/v, about 1% w/v to about 5% w/v, or about 1% w/v to about 3% w/v. For example, the date seed powder can be present at a concentration of about 10% w/v, 7%, 5%, 3%, 2% or about 1% w/v.

The drilling fluid can be adapted to be a carrier fluid for particulates. For example, during drilling, rock cuttings can be carried uphole by the drilling fluid and flowed out of the wellbore. Rock cuttings can range in size from silt-sized particles to chunks measured in centimeters. The rock cuttings can have specific gravity greater than 2. These high-density cuttings have a tendency to separate from water or oil very rapidly. A homogenizer can be used to increase the ability of a fluid to suspend and carry a particulate material in a well fluid (e.g., the date seed powder).

In some embodiments, the homogenizer includes at least one of psyllium husk, modified starch, or xanthan gum. The homogenizer can also include at least a polysaccharide; a biopolymers or derivatives thereof that contain one or more of these monosaccharide units: galactose; mannose; glucoside; glucose; xylose; arabinose; fructose; glucuronic acid; or pyranosyl sulfate. Examples of suitable polysaccharides include, but are not limited to, guar gums (e.g., hydroxyethyl guar, hydroxypropyl guar, carboxymethyl guar, carboxymethylhydroxyethyl guar, and carboxymethylhydroxypropyl guar ("CMHPG")); cellulose derivatives (e.g., hydroxyethyl cellulose, carboxyethylcellulose, carboxymethylcellulose, and carboxymethyl hydroxyethyl cellulose); scleroglucan; succinoglycan; diutan; and combinations thereof. In some embodiments, the homogenizer includes at least one of psyllium husk, modified starch, or xanthan gum.

The homogenizer can be present at a concentration of about 0.1% to about 5% w/v. For example, the homogenizer includes xanthan gum and is present at a concentration of about 0.3% w/v. In some embodiments, the homogenizer includes modified starch and is present at a concentration of about 0.3% w/v. In some embodiments, the homogenizer includes psyllium husk and is present at a concentration of about 0.6% w/v.

The homogenizer can be present at a concentration of about 0.1% to about 10% w/v, about 0.1% to about 8% w/v, about 0.1% to about 6% w/v, about 0.1% to about 5% w/v, about 0.1% to about 4% w/v, about 0.1% to about 3% w/v, about 0.1% to about 2% w/v, or about 0.1% to about 1% w/v. For example, the homogenizer can be present at a concentration of about 10% w/v, 8%, 6%, 5%, 4%, 3%, 2%, 1%, 0.9%, 0.6%, or about 0.3% w/v. The homogenizer can include xanthan gum and be present at a concentration of about 0.1% to about 2% w/v. For example, the homogenizer can include xanthan gum and be present at a concentration of about 0.3% w/v. The homogenizer can include modified starch and be present at a concentration of about 0.1% to about 2% w/v. For example, the homogenizer can include modified starch and be present at a concentration of about 0.3% w/v. The homogenizer can include psyllium husk and be present at a concentration of about 1% to about 3% w/v. For example, the homogenizer can include psyllium husk and be present at a concentration of about 0.6% w/v.

In some embodiments, the method further includes adding an alkaline salt to the drilling fluid to increase the pH of the fluid. The alkaline salt can include sodium hydroxide, potassium hydroxide, magnesium hydroxide, calcium hydroxide, sodium silicate, sodium carbonate, magnesium oxide, and combinations thereof. In some embodiments, the alkaline salt includes sodium hydroxide. The quantity of alkaline salt can be sufficient to increase the pH of the drilling fluid to a pH of greater than about 9. For example, the quantity of alkaline salt can be sufficient to increase the pH of the drilling fluid to a pH of between about 9 and about 10.5.

In some embodiments, the method further includes adding a defoamer to the drilling fluid. The quantity of defoamer can be sufficient to remove air bubbles from the fluid.

The drilling fluid can additionally include one or more additives including a surfactant (e.g., a foamer, a wetting agent, a detergent, a lubricant, or a corrosion inhibitor), a water softener, an oxygen scavenger, a biocide, a corrosion inhibitor, and a weighting agent.

Examples of weighting agents are water-soluble salts, including inorganic salts. The weighting agent can be dissolved in the fluid (e.g., water). Salts can be added to a water source, for example, to provide a brine, and a resulting drilling fluid, having a desired density. Salts can also be included for reasons related to compatibility of the drilling fluid with the formation and formation fluids.

Evaluation of Drilling Fluids

Each drilling fluid prepared by implementing process 300 described above was evaluated. In some implementations, each drilling fluid was evaluated by performing one or more of spurt loss tests, fluid loss tests, mud cake thickness tests, or filtration time tests under API conditions. In some implementations, one or more of the spurt loss tests, fluid loss tests, mud cake thickness tests, or filtration tests were performed under HTHP conditions. Drilling fluids were also prepared without date seed powder and evaluated under the API conditions and the HTHP conditions. A comparison the evaluation results revealed that drilling fluids that include date seed powder show superior fluid loss prevention relative to drilling fluids that do not include date seed powder.

The compositions of several drilling fluids are described with reference to tables below. Each drilling fluid can be manufactured by implementing all or portions of process 300 described above.

EXAMPLES

Examples I and II

The composition of a first drilling fluid (Example I) and a second drilling fluid (Example II) are shown in Table 1. As shown below, Example I does not include any date seed powder and Example II includes a quantity of date seed powder. In addition, each of Example I and Example II uses 1 g of xanthan gum (XC) as the homogenizer to increase the viscosity of water.

TABLE 1

Composition of Example I and Example II drilling fluids.

| Drilling Fluid Components | Example I | Example II |
|---|---|---|
| Water (mL) | 350 | 350 |
| PHP (g) | 0 | 0 |
| XC (g) | 1 | 1 |
| MS (g) | 0 | 0 |
| Date Seed Powder (g) | 0 | 6 |
| NaOH (mL) | As required to raise pH to 10 | As required to raise pH to 10 |
| Defoamer (cc) | 2 to 3 drops as required | 2 to 3 drops as required |

Examples III and IV

The composition of a third drilling fluid (Example III) and a fourth drilling fluid (Example IV) are shown in Table 2. As shown below, Example III does not include any date seed powder and Example IV includes a quantity of date seed powder. In addition, Example III uses 6 g of MS as the homogenizer, and Example IV uses 1 g of XC as the homogenizer to increase the viscosity of water.

TABLE 2

Composition of Example III and Example IV drilling fluids.

| Drilling Fluid Components | Example III | Example IV |
|---|---|---|
| Water (mL) | 350 | 350 |
| PHP (g) | 0 | 0 |
| XC (g) | 0 | 1 |
| MS (g) | 6 | 0 |
| Date Seed Powder (g) | 0 | 6 |
| NaOH (mL) | As required to raise pH to 10 | As required to raise pH to 10 |
| Defoamer (cc) | 2 to 3 drops as required | 2 to 3 drops as required |

Examples V and VI

The composition of a fifth drilling fluid (Example V) and a sixth drilling fluid (Example VI) are shown in Table 3. As shown below, Example V does not include any date seed powder and Example VI includes a quantity of date seed powder. In addition, each of Example V and Example VI uses 2 g of psyllium husk (PHP) as the homogenizer to increase the viscosity of water.

TABLE 3

Composition of Example V and Example VI drilling fluids.

| Drilling Fluid Components | Example V | Example VI |
|---|---|---|
| Water (mL) | 350 | 350 |
| PHP (g) | 2 | 2 |
| XC (g) | 0 | 0 |
| MS (g) | 6 | 0 |
| Date Seed Powder (g) | 0 | 6 |
| NaOH (mL) | As required to raise pH to 10 | As required to raise pH to 10 |
| Defoamer (cc) | 2 to 3 drops as required | 2 to 3 drops as required |

Each of Examples I-VI described above is clay-free. The water used in each of Examples I-VI is fresh water. Examples I-VI, described above, were evaluated for fluid loss behavior. Examples VII-X, described below, were evaluated for fluid loss behavior under HTHP conditions.

Examples VII, VIII, IX, and X

Compositions of a seventh drilling fluid (Example VII), an eighth drilling fluid (Example VIII), a ninth drilling fluid (Example IX), and a tenth drilling fluid (Example X) are shown in Table 4. Examples VII and VIII were manufactured using fresh water, and Examples IX and X were manufactured using red sea water. Each of Examples VII, VIII, IX and X uses 2 g of PHP as a homogenizer to increase the viscosity of water. In addition, Examples VII and IX did not include any date seed powder, and Examples VIII and X included a quantity of date seed powder. Each of Examples VII, VIII, IX and X is clay-free.

TABLE 4

Composition of Examples VII, VIII, IX and X drilling fluids.

| Drilling Fluid Components | Example VII | Example VIII | Example IX | Example X |
|---|---|---|---|---|
| Fresh water (ml) | 350 | 350 | — | — |
| Red sea water (ml) | — | — | 350 | 350 |
| PHP (g) | 2 | 2 | 2 | 2 |
| DSP (g) | 0 | 6 | 0 | 6 |
| NaOH (ml) | As required to raise pH to 10 | As required to raise pH to 10 | As required to raise pH to 10 | As required to raise pH to 10 |
| Defoamer (cc) | 2 to 3 drops as required | 2 to 3 drops as required | 2 to 3 drops as required | 2 to 3 drops as required |

Results

The API filtration properties of Examples I-VI were measured. Table 5 below shows the experimental results of API tests.

TABLE 5

API fluid loss test results for example drilling fluids.

| | API Test (Room temperature & 100 psi overbalance pressure) | | | |
|---|---|---|---|---|
| Drilling Fluid | Spurt loss (cc) | Fluid loss (cc) | Mud cake thickness (mm) | Filtration time (min) |
| Example 1 | 90 | 175 | 0.397 | 30 |
| Example II | 9 | 31 | 0.794 | 30 |
| Example III | 45 | 86 | 1.59 | 30 |
| Example IV | 24 | 35 | 0.794 | 30 |
| Example V | 2 | 18 | 0.794 | 30 |
| Example VI | 1 | 12 | 0.794 | 30 |

Figure 4:
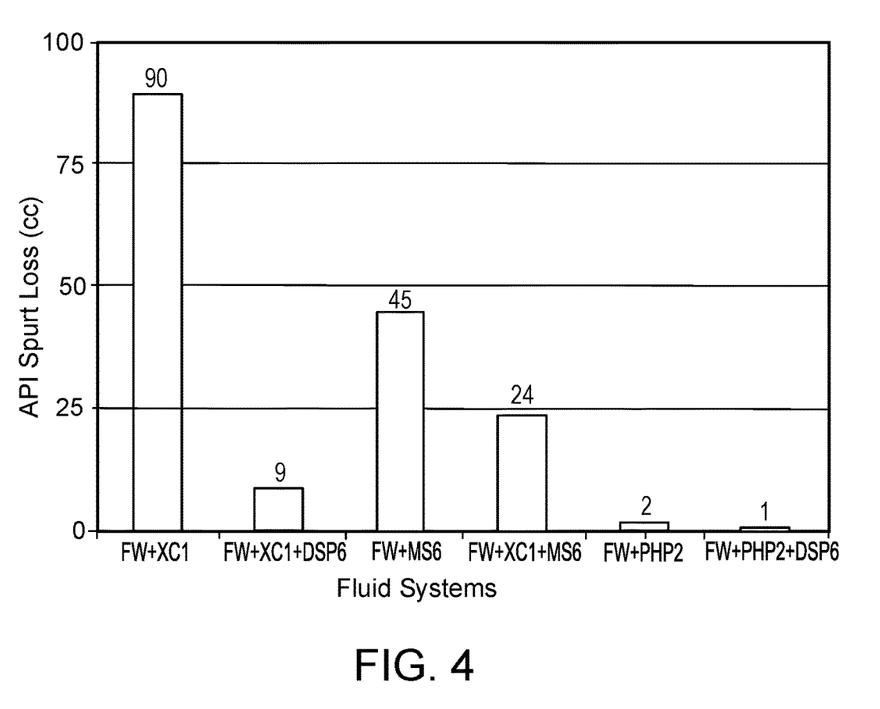
FIG. 4 is a bar graph showing spurt loss behavior of example drilling fluids.

FIG. 4 is a bar graph 400 showing spurt loss behavior of example drilling fluids. Comparison of spurt loss behavior of clay-free Example I and Example II indicates 90 cc API spurt loss for Example I, which does not include date seed powder, but only 9 cc API spurt loss for Example II which includes date seed powder. This is about 90% drop of API spurt loss due to the presence of date seed powder. This result proves the application and suitability of date seed powder as fluid loss additive or additive supplement for water-based drilling fluid systems.

Comparison of the spurt loss behavior of clay-free Example III, which is a conventional fluid loss additive, with Example IV, which contains date seed powder, also reveals improved spurt loss behavior for the drilling fluid which includes date seed powder. The spurt loss behavior for Example IV is about 40% lower relative to that for Example III. This result again supports the application of date seed powder as a fluid loss additive to control the fluid loss behavior of water-based muds.

Comparison of the spurt loss behavior of clay-free Example V, which does not include date seed powder, and Example VI, which includes date seed powder, revealed that the spurt loss behavior of Example VI is about 50% lower than that of Example V, although the spurt loss behavior of both examples is low (i.e., less than or equal to about 2 cc). This result further proves the suitability of date seed powder as a fluid loss additive for water-based mud systems.

Figure 5:
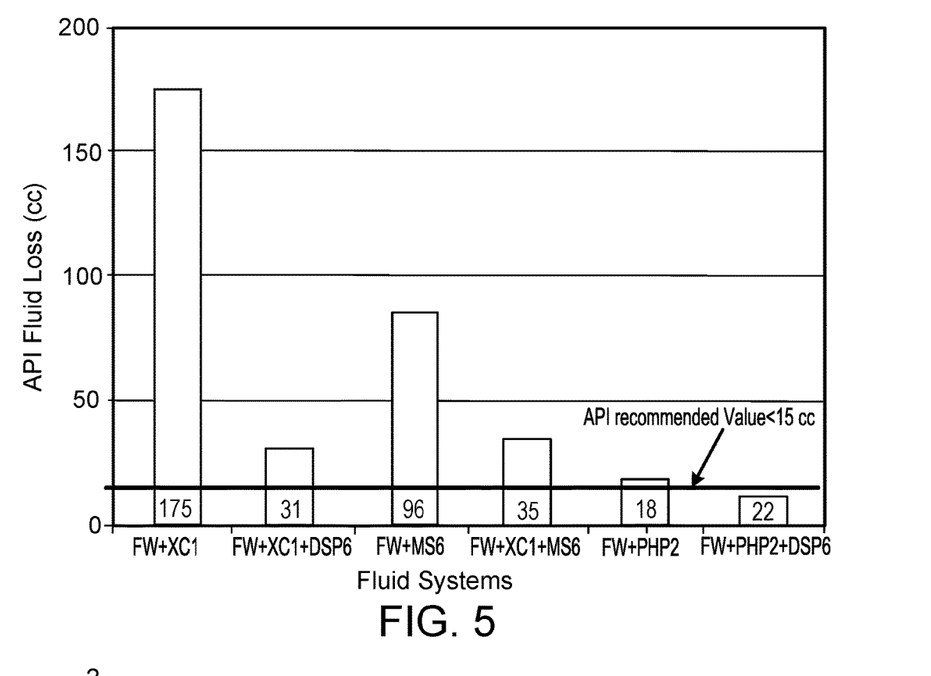
FIG. 5 is a bar graph showing API fluid loss behavior of example drilling fluids.

FIG. 5 is a bar graph 500 showing API fluid loss behavior of example drilling fluids. Comparison of fluid loss behavior of clay-free Example I and Example II indicates 175 cc API fluid loss for Example I, which does not include date seed powder, but only 31 cc API fluid loss for Example II, which includes date seed powder. This is about 82% drop of fluid loss due to the presence of date seed powder. This result proves the application and suitability of date seed powder as fluid loss additive or additive supplement for water-based drilling fluid systems.

Comparison of the fluid loss behavior of clay-free Example III, which is a conventional fluid loss additive, with Example IV, which contains date seed powder, also reveals improved fluid loss behavior for the drilling fluid which includes date seed powder. This result again supports the application of date seed powder as a fluid loss additive to control the fluid loss behavior of water-based muds.

Comparison of the fluid loss behavior of clay-free Example V, which does not include date seed powder, and Example VI, which includes date seed powder, revealed that the fluid loss behavior of Example VI is about 50% lower than that of Example V, which does not include date seed powder. This result further proves the suitability of date seed powder as a fluid loss additive for water-based mud systems. The line shown in FIG. 5 indicates the API recommended maximum fluid loss value (which is less than 15 cc/30 minutes filtration time) for water-based drilling fluid system. The presence of date seed powder in Examples II, IV and VI reduced the filtration behavior of the system to 25% below the API recommended value. The results again demonstrate the suitability of the date seed powder as a fluid loss additive or additive supplement for water-based drilling fluid systems.

Figure 6:
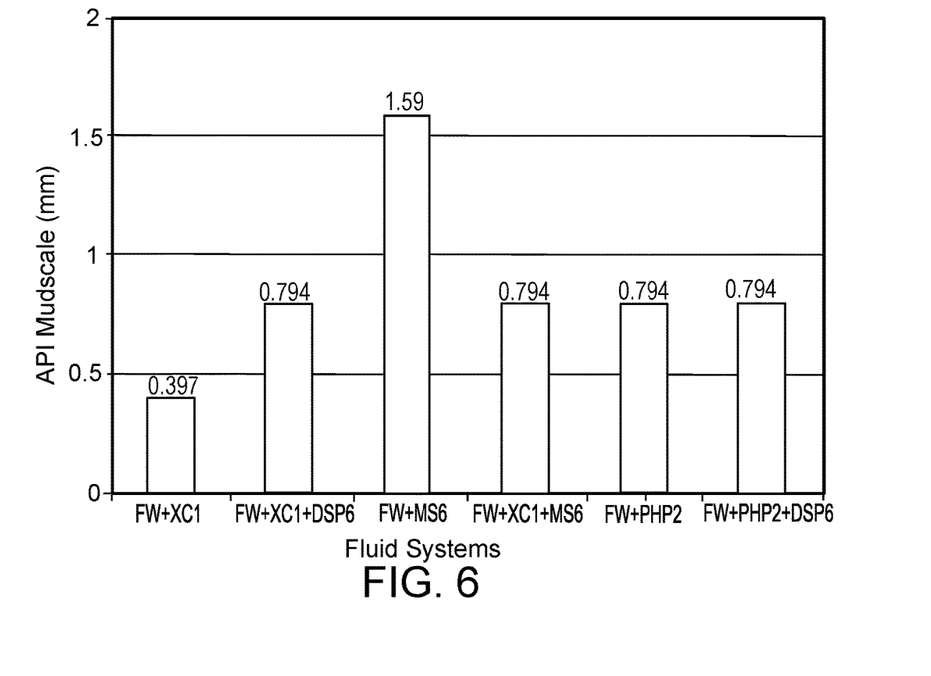
FIG. 6 is a bar graph showing mud cake quality and thickness of example drilling fluids.

FIG. 6 is a bar graph 600 showing mud cake quality and thickness of example drilling fluids. Comparison of mud cake thickness of clay-free Example I and Example II indicates formation of very thin but poor quality mud cake for Example I, which does not include date seed powder, but a thin and good quality mud cake for Example II, which includes date seed powder. The quality of mud cake in Example II is reflected by the significant drop in API spurt and fluid loss behavior of Example II. Similar results are observed for Example IV and Example VI relative to Example III and Example V, respectively. The deposition of good quality and thin mud cakes in the presence of date seed powder as fluid loss additive or additive supplement will play a positive role in reducing the scope of differential sticking problems in a differential sticking prone borehole environments. It will also play a positive role in reducing other mud cake related drilling problems. For these reasons, the date palm industry by-product 'date seed' has a high potential to use as a locally available raw materials for development of additives/products for oil and gas fields application.

Table 6 shows the experimental results of the HTHP tests.

TABLE 6

HTHP test results for example drilling fluids.

| Drilling Fluid | HTHP test (100° C. and 500 psi overbalance pressure) | | |
|---|---|---|---|
| | Spurt loss (cc) | Fluid loss (cc) | Mud cake thickness (mm) |
| Example VII | 8.4 | 76.4 | 1.984 |
| Example VIII | 4 | 30 | 1.588 |
| Example IX | 6 | 47 | 1.984 |
| Example X | 4.53 | 21 | 1.984 |

Figure 7:
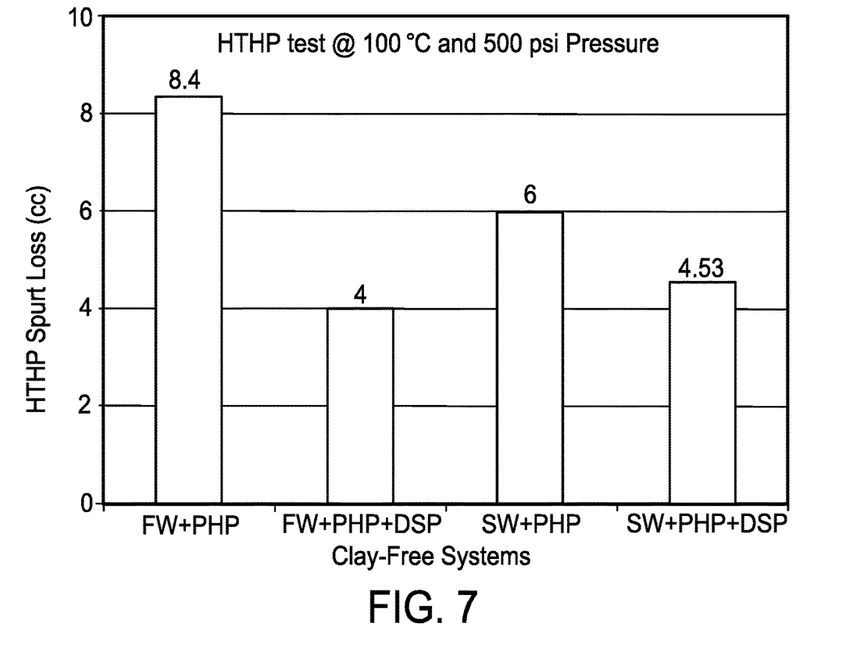
FIG. 7 is a bar graph showing spurt loss behavior of example drilling fluids evaluated under High Temperature/High Pressure (HTHP) conditions.

FIG. 7 is a bar graph 700 showing spurt loss behavior of example drilling fluids evaluated under HTHP conditions. Comparison of spurt loss behavior of clay-free Example VII and Example VIII indicates 8.4 cc HTHP spurt loss in Example VII, which does not include date seed powder, but only 4 cc HTHP spurt loss in Example VIII, which includes date seed powder. This is more than 50% drop of HTHP fluid loss in Example VIII relative to Example VII due to the presence of date seed powder. Comparison of spurt loss behavior of clay-free Example IX and Example X reveal a similar reduction in spurt loss in the presence of date seed powder, thereby supporting the application of date seed powder as a fluid loss additive or additive supplement for both fresh and sea-water based drilling fluid systems.

Figure 8:
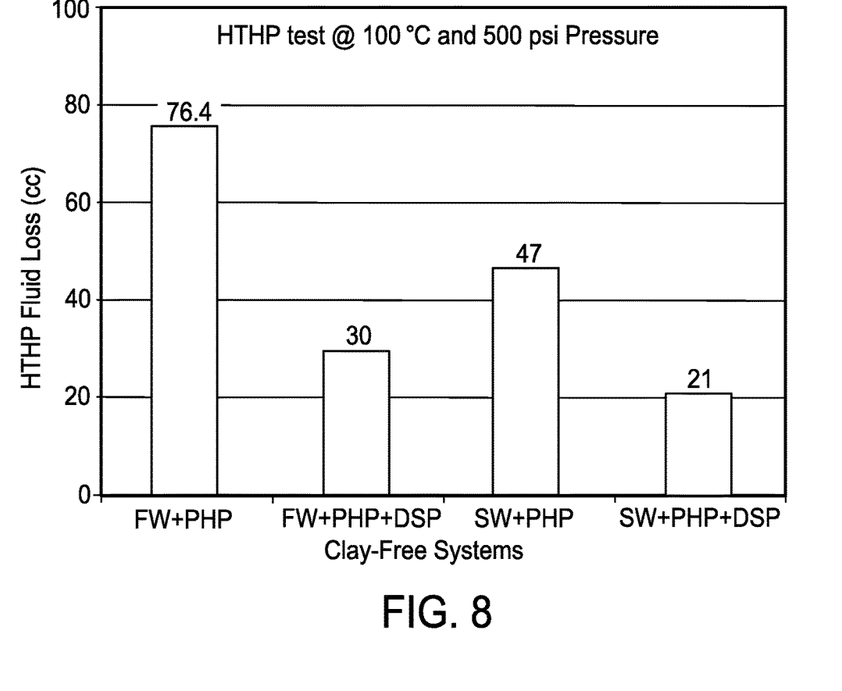
FIG. 8 is a bar graph showing fluid loss behavior of example drilling fluids evaluated under HTHP conditions.

FIG. 8 is a bar graph 800 showing fluid loss behavior of example drilling fluids evaluated under HTHP conditions. Comparison of fluid loss behavior of clay-free Example VII and Example VIII indicates 76.4 cc HTHP fluid loss in Example VII, which does not include date seed powder, but only 30 cc HTHP fluid loss in Example VIII, which includes date seed powder. This is more than 60% drop of HTHP fluid loss in Example VIII relative to Example VII due to the presence of date seed powder. Comparison of fluid loss behavior of clay-free Example IX and Example X reveal a similar reduction in fluid loss in the presence of date seed powder, thereby supporting the application of date seed powder as a fluid loss additive or additive supplement for both fresh and sea-water based drilling fluid systems.

Figure 9:
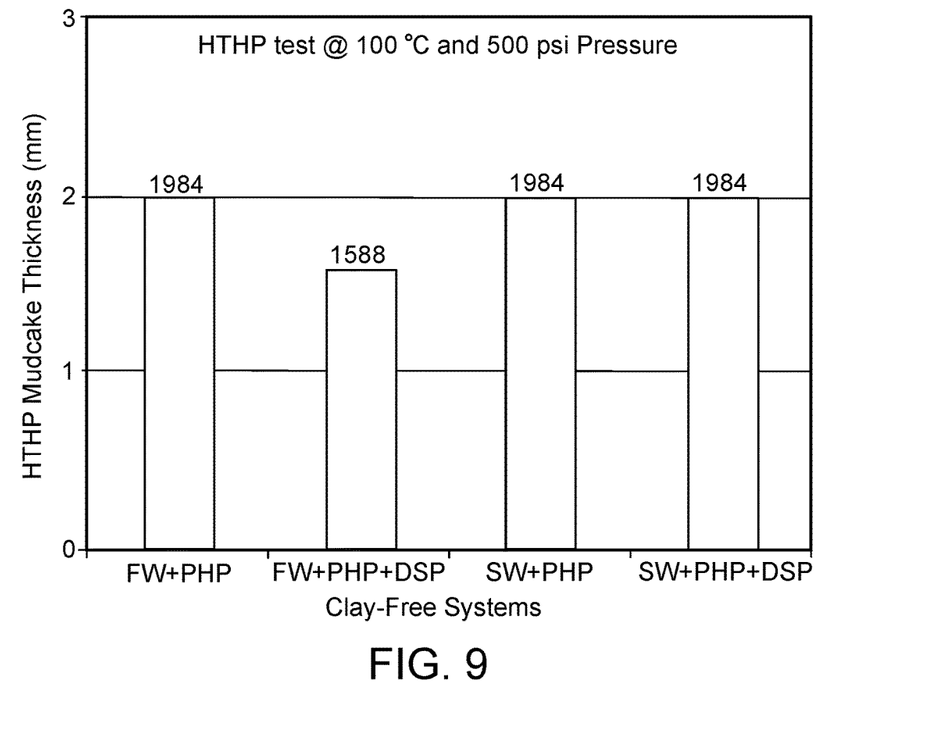
FIG. 9 is a bar graph showing mud cake thickness of example drilling fluids evaluated under HTHP conditions.

FIG. 9 is a bar graph 900 showing mud cake thickness of example drilling fluids evaluated under HTHP conditions. Comparison of mud cake thickness of Examples VII, VIII, IX, and X indicates the formation of very thin mud cakes both in the absence and presence of the date seed powder. This indicates no unusual effect of the date seed powder in the physical behavior, i.e., thickness of the mud cakes. However, the drilling fluids containing no date seed powder (i.e., Examples VII and IX) produced poor quality mud cakes due to the lack of formation of a well dispersed and tough mud cake while conducting the filtration test relative to the drilling fluids containing date seed powder (i.e., Examples VIII and X). The superior quality of mud cake formed when using drilling fluids that contain date seed powder is reflected by the well dispersed and homogeneous nature of the mud cakes along with a significant drop of HTHP spurt and fluid loss behavior of the drilling fluids. The deposition of good quality and thin mud cakes in the presence of date seed powder can play a positive role in reducing the scope of differential sticking in a differential sticking prone borehole environments.

Figure 10:
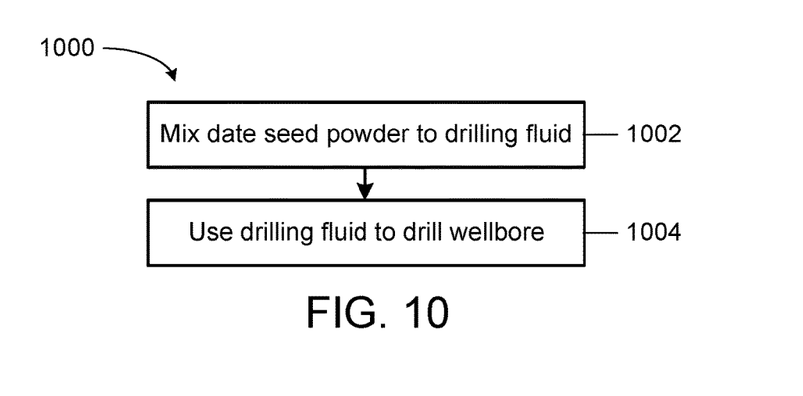
FIG. 10 is a flowchart of an example process for using drilling fluid that includes date seed powder to drill a wellbore.

FIG. 10 is a flowchart of an example process 1000 for using drilling fluid that includes date seed powder to drill a wellbore. At 1002, date seed powder is mixed to drilling fluid. For example, date seed powder can be mixed to drilling fluid to manufacture any of Examples II, IV, VI, VIII or X described above. Alternatively, other quantities of date seed powder can be mixed with other volumes of other drilling fluids to manufacture drilling fluids different from Examples II, IV, VI, VIII or X described above. At 1004, the drilling fluid including the date seed powder can be used to drill a wellbore. For example, the drilling fluid can be pumped into a drill string from the surface of the wellbore, through the drill bits in the drilling system positioned in the wellbore, through the annulus formed between the drill string and the wellbore, and out of the surface of the wellbore. In some implementations, 6 grams of date seed powder can be mixed with 350 ml of water to produce a homogenous slurry.

Particular implementations of the subject matter have been described. The sequence of processes described here can be different from the sequence shown and described with reference to the flowcharts. In some implementations, one or more of the processes shown in the sequence can be omitted. For example, the roasted seeds can be ground prior to or without cooling the seeds. In another example, the alkaline salt can be added before the homogenizer. In a further example, the homogenizer and the salt can be added to the water before the date seed powder. Other implementations are within the scope of the following claims.

The invention claimed is:

1. A method comprising:
   combining a date seed powder and water;
   suspending the date seed powder in the water with a homogenizer to yield a water-based drilling fluid; and
   providing the water-based drilling fluid to a wellbore.

2. The method of claim 1, wherein the water-based drilling fluid is a clay-free water-based drilling fluid.

3. The method of claim 1, wherein the homogenizer comprises at least one of psyllium husk, modified starch, and xanthan gum.

4. The method of claim 1, wherein the homogenizer is present at a concentration of about 0.1% w/v to about 5% w/v.

5. The method of claim 1, further comprising adding an alkaline salt to the water-based drilling fluid to increase a pH of the water-based drilling fluid.

6. The method of claim 5, wherein a quantity of the alkaline salt is sufficient to increase the pH of the water-based drilling fluid to greater than about 9.

7. The method of claim 1, wherein the date seed powder has a size distribution of less than about 150 μm.

8. The method of claim 1, wherein the date seed powder is present at a concentration of about 1% w/v to about 5% w/v.

9. A method comprising:
   providing a water-based drilling fluid to a wellbore, the water-based drilling fluid comprising:
      water;
      a date seed powder; and
      a homogenizer,
      wherein the homogenizer suspends the date seed powder in the water; and
   drilling the wellbore.

10. The method of claim 9, wherein the water-based drilling fluid is a clay-free water-based drilling fluid.

11. The method of claim 9, wherein the homogenizer comprises at least one of psyllium husk, modified starch, and xanthan gum.

12. The method of claim 9, wherein the homogenizer is present at a concentration of about 0.1% w/v to about 5% w/v.

13. The method of claim 9, further comprising adding an alkaline salt to the water-based drilling fluid to increase a pH of the fluid.

14. The method of claim 13, wherein a quantity of the alkaline salt is sufficient to increase the pH of the water-based drilling fluid to greater than about 9.

15. The method of claim 9, wherein the date seed powder has a size distribution less than about 150 µm.

16. The method of claim 9, wherein the date seed powder is present at a concentration of about 1% w/v to about 5% w/v.

17. A drilling fluid comprising:
a date seed powder;
a homogenizer; and
water,
wherein the homogenizer suspends the date seed powder in the water, and the drilling fluid is a water-based drilling fluid.

18. The drilling fluid of claim 17, wherein the water-based drilling fluid is a clay-free water-based drilling fluid.

19. The drilling fluid of claim 17, wherein the homogenizer comprises at least one of psyllium husk, modified starch, and xanthan gum.

20. The drilling fluid of claim 17, wherein the homogenizer is present at a concentration of about 0.1% w/v to about 5% w/v.

21. The drilling fluid of claim 17, further comprising an alkaline salt.

22. The drilling fluid of claim 17, wherein the water-based drilling fluid has a pH of greater than about 9.

23. The drilling fluid of claim 17, wherein the date seed powder has a size distribution less than about 150 µm.

24. The drilling fluid of claim 17, wherein the date seed powder is present at a concentration of about 1% w/v to about 5% w/v.

* * * * *

UNITED STATES PATENT AND TRADEMARK OFFICE
CERTIFICATE OF CORRECTION

PATENT NO. : 9,957,433 B2  
APPLICATION NO. : 15/135057  
DATED : May 1, 2018  
INVENTOR(S) : Md Amanullah et al.

Page 1 of 1

It is certified that error appears in the above-identified patent and that said Letters Patent is hereby corrected as shown below:

On the Title Page

Under (*) Notice:
Column 1, Line 3, delete "days. days." and insert --days.--.

Signed and Sealed this
Twenty-fifth Day of December, 2018

Andrei Iancu
*Director of the United States Patent and Trademark Office*